US011726991B2

United States Patent

(12) United States Patent
Wang et al.

(10) Patent No.: US 11,726,991 B2
(45) Date of Patent: Aug. 15, 2023

(54) BULK UPDATING OF MAPPING POINTERS WITH METADATA TRANSACTION LOG

(71) Applicant: EMC IP Holding Company LLC, Hopkinton, MA (US)

(72) Inventors: Yubing Wang, Southborough, MA (US); Philippe Armangau, Acton, MA (US); Ajay Karri, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 284 days.

(21) Appl. No.: 16/398,763

(22) Filed: Apr. 30, 2019

(65) Prior Publication Data

US 2020/0349149 A1 Nov. 5, 2020

(51) Int. Cl.

*G06F 16/23* (2019.01)
*G06F 16/13* (2019.01)
*G06F 16/18* (2019.01)

(52) U.S. Cl.

CPC .......... *G06F 16/2386* (2019.01); *G06F 16/13* (2019.01); *G06F 16/1865* (2019.01)

(58) Field of Classification Search

None

See application file for complete search history.

(56) References Cited

U.S. PATENT DOCUMENTS

| | | | | |
|---|---|---|---|---|
| 7,689,599 | B1 | 3/2010 | Shah et al. | |
| 7,797,483 | B1 | 9/2010 | Suryanarayanan et al. | |
| 8,190,850 | B1 * | 5/2012 | Davenport | G06F 16/10 711/202 |
| 8,275,968 | B2 | 9/2012 | Bacik | |
| 8,495,338 | B2 | 7/2013 | Jeddeloh | |
| 8,612,382 | B1 * | 12/2013 | Patel | G06F 11/0793 707/639 |
| 8,862,810 | B2 | 10/2014 | Lee et al. | |
| 8,898,204 | B1 | 11/2014 | Sathe et al. | |
| 9,280,578 | B1 * | 3/2016 | Zhou | G06F 16/1774 |
| 9,311,333 | B1 * | 4/2016 | Pawar | G06F 16/1865 |
| 9,430,503 | B1 * | 8/2016 | Delgado | G06F 16/21 |
| 9,442,995 | B2 * | 9/2016 | Pareek | G06F 16/3331 |
| 2014/0019405 | A1 | 1/2014 | Borthakur et al. | |
| 2019/0188091 | A1 * | 6/2019 | Christiansen | G06F 3/0613 |

* cited by examiner

*Primary Examiner* — Neveen Abel Jalil
*Assistant Examiner* — John J Morris
(74) *Attorney, Agent, or Firm* — BainwoodHuang

(57) ABSTRACT

A technique for managing a metadata transaction log consolidates multiple mapping pointer changes that affect a single metadata block in a single transaction entry. The technique creates a data structure that identifies the mapping pointers in the metadata block that are changing, and stores the data structure in the transaction entry along with records that describe the individual mapping pointer changes.

23 Claims, 5 Drawing Sheets

BULK UPDATING OF MAPPING POINTERS WITH METADATA TRANSACTION LOG

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some data storage systems employ file systems for organizing files and/or directories, and some file systems employ metadata transaction logs. As is known, a metadata transaction log is a persistent log that stores changes in file-system metadata until such changes can be fixed in persistent file system structures. For example, a file system may receive a write request that specifies an update to a particular file's data. To accommodate the update, the file system makes a number of metadata changes, such as updating the file's inode, updating virtual block maps (VBMs), and allocating or changing mapping pointers, such as those found in indirect blocks (IBs). The file system can make these changes efficiently in memory, but writing out the changed structures to proper locations on disk may take significant time. To promote speed without risking metadata loss, the file system temporarily stores the metadata changes in the metadata transaction log. The file system may eventually write the changed structures to proper locations on disk and then remove the corresponding changes from the log. But if the storage system encounters a fault before it finishes writing the structures to disk, the file system can turn to the transaction log when recovering from the fault, identify the unfinished actions, and perform the actions, thus avoiding metadata corruption and restoring the file system to a consistent state.

SUMMARY

Unfortunately, conventional metadata transaction logs can be inefficient when handling changes in mapping pointers. For example, a common arrangement creates a new transaction for each mapping pointer that changes. Given that a file can require thousands of mapping pointers for mapping its data, the number of transactions recorded for supporting mapping pointer changes can be large. If a storage system encounters a fault and subsequently must access the metadata transaction log, the resulting recovery activities may require a large number of small writes to individual mapping pointers. Such small writes tend to be inefficient, as data storage systems generally handle large writes better than small ones. Many small writes may also be unhealthy for disk drives, especially flash drives. They also tend to create contention for storage resources. For example, updating a single mapping pointer may require obtaining a lock on the entire indirect block that contains it. If many mapping pointers in a single indirect block are being changed, the updates may have to wait in line to access the indirect block. Such contention can limit the speed of recovery and extend the resulting downtime.

In contrast with prior approaches, which tend to be inefficient when handling mapping pointer changes, an improved technique for managing a metadata transaction log consolidates multiple mapping pointer changes that affect a single metadata block in a single transaction entry. The technique creates a data structure that identifies the mapping pointers in the metadata block that are changing, and stores the data structure in the transaction entry along with records that describe the individual mapping pointer changes.

Advantageously, the improved technique reduces the number of transactions needed to describe multiple mapping-pointer changes. In the event of a system fault, transactions read from the metadata transaction log can prescribe bulk updates to metadata blocks, resulting in fewer small writes to disk, reduced contention for resources, and reduced downtime, thereby improving user experience.

Certain embodiments are directed to a method of managing a metadata transaction log used by a file system. The method includes generating multiple records that specify changes to respective mapping pointers in a metadata block of the file system. The method further includes creating a data structure that identifies each of the mapping pointers that is being changed in the metadata block and creating an entry in the metadata transaction log that stores the data structure together with the records.

Other embodiments are directed to a computerized apparatus constructed and arranged to perform a method of managing a metadata transaction log, such as the method described above. Still other embodiments are directed to a computer program product. The computer program product stores instructions which, when executed on control circuitry of a computerized apparatus, cause the computerized apparatus to perform a method of managing a metadata transaction log, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. One should appreciate that such embodiments are provided by way of example to illustrate certain features and principles of the invention but that the invention hereof is not limited to the particular embodiments described.

An improved technique for managing a metadata transaction log consolidates multiple mapping pointer changes that affect a single metadata block in a single transaction entry. The technique creates a data structure that identifies mapping pointers in the metadata block that are changing and stores the data structure in the transaction entry along with records that describe the individual mapping pointer changes.

Figure 1:
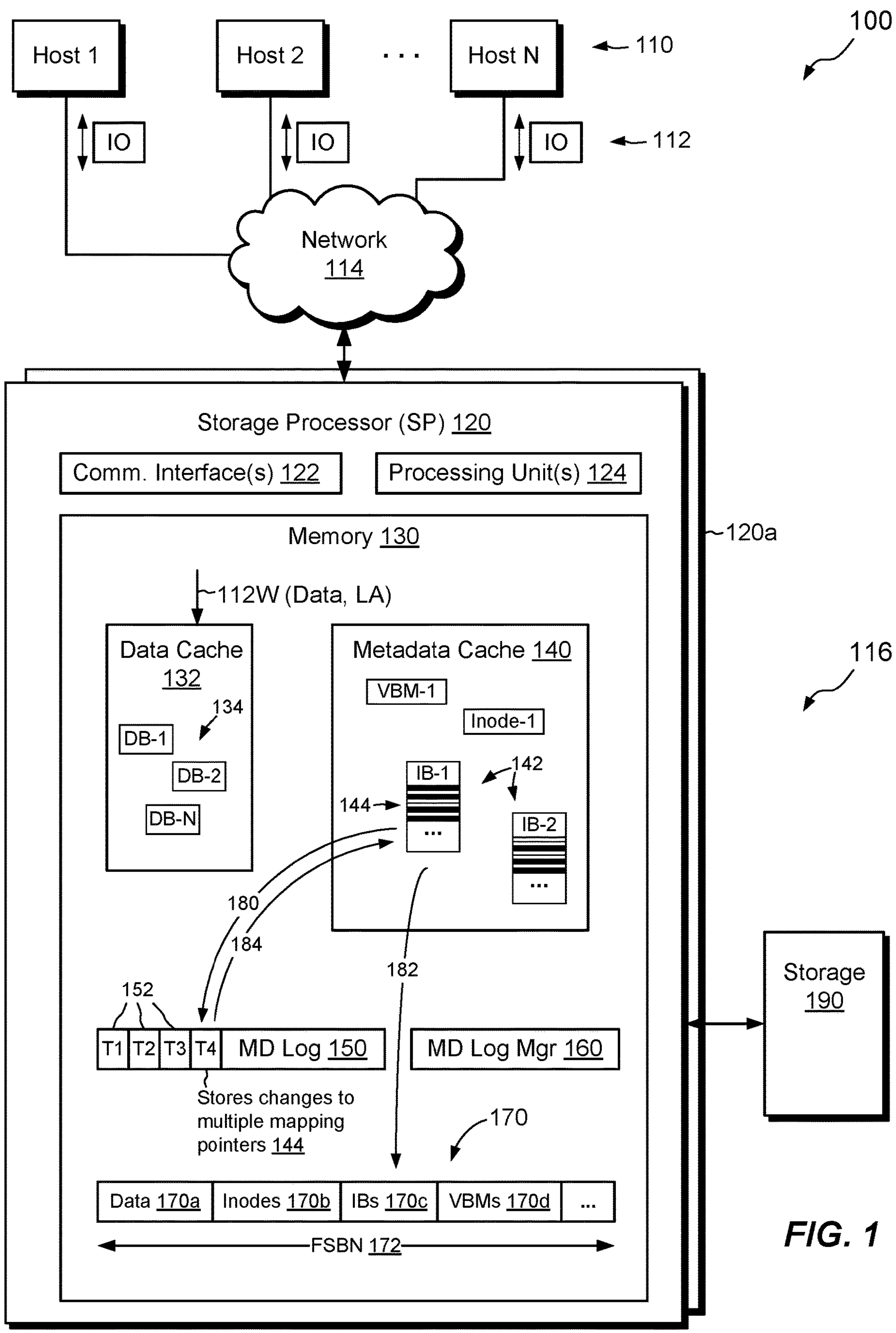
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 190, such as magnetic disk drives, electronic flash drives, optical drives, and/or the like. The data storage system 116 may include multiple SPs (e.g., a second SP 120*a*). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 190.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, data cache 132, metadata cache 140, metadata log 150, metadata log manager 160, and file system 170. The data cache 132 is configured to receive data specified in writes 112W from hosts 110 and to arrange the host data in data blocks 134, such as blocks DB-1, DB-2, and DB-N. The metadata cache 140 is configured to store file-system metadata, such as inodes (e.g., Inode-1), virtual block maps (e.g., VBM-1), and indirect blocks 142, such as IB-1 and IB-2. File system 170 may use such metadata for mapping or describing the data blocks 134.

In an example, each indirect block 142 participates in mapping a file in file system 170. Also, each indirect block 142 contains an array of block pointers 144, such as 1024 block pointers, for example. The file being mapped by indirect blocks 142 may be a host-accessible file, such as a file belonging to a host file system, or it may be an internal file, which need not be directly accessible to hosts 110. For example, some arrangements use files as common structures for implementing a variety of different data objects, such as LUNs (Logical UNits), file systems, and virtual machine disks. Although this disclosure refers to files in file system 170, there is no requirement that such files be directly host-accessible, or that the I/O requests 112W directly address particular files. To the contrary, the I/O requests 112W can address LUNs and/or virtual machine disks, as well as particular files. Writes 112W may be directed to data objects that internally map to files in different file systems. An example of a storage system that uses files as a common storage structure is described in U.S. Pat. No. 9,286,007, the contents and teachings of which are incorporated herein by reference in their entirety.

The metadata transaction log 150 is configured to store metadata transactions, which have not yet been written to persistent file system structures in storage 190. For example, metadata log manager 160 is configured to identify changes in metadata found in the metadata cache 140 and to aggregate those changes into groups of changes that can be made atomically, i.e., all at once or not at all. The metadata log manager 160 is further configured to write each group of changes into a respective transaction 152 (e.g., as one of transactions T1, T2, T3, T4, and so on). In accordance with improvements hereof, the metadata log manager 160 is further configured to group, within a single transaction, updates to multiple mapping pointers 144 that reside within a single indirect block 142. Thus, for example, a single transaction 152 may specify updates to as many as 1024 mapping pointers 144. The improved arrangement thus greatly consolidates related transactions and reduces the number of transactions in the metadata transaction log 150 needed to support mapping pointer changes. In an example, the metadata transaction log 150 is implemented as an intent log, meaning that the transactions 152 reflect the state of metadata blocks after the specified changes have been put in place. Also, in some examples, the metadata transaction log 150 is configured as a circular log, having a head and a tail, with new transactions added to the head and old transactions processed from the tail.

As further shown in FIG. 1, file system 170 has an address space 172, which may be denominated in blocks, with each block having a unique address, also known as a File System Block Number (FSBN). As is known, a "block" is a uniformly-sized extent of contiguous data, which may be 4 kB or 8 kB, for example. Within the address space 172, the file system 170 may be divided into various subspaces, such as a data subspace 170*a* for storing file data, an inode subspace 170*b* for storing inodes, an IB subspace 170*c* for storing indirect blocks, and a VBM subspace 170 for storing VBMs. Other subspaces may be provided. Also, one should appreciate that subspaces are shown merely for illustration and are not required.

In example operation, hosts 110 issue I/O requests 112 to the data storage system 116. SP 120 receives the I/O requests 112 at the communication interfaces 122 and initiates further processing. Some of the I/O requests are write requests 112W, which specify writes of data to designated data objects hosted by the data storage system 116. Upon receiving each write request 112W, the SP 120 may place the data being written into one or more data blocks 134 in the data cache 132. SP 120 may also collect and/or calculate metadata required for mapping or describing the data blocks 134, such as the depicted inode, VBM, and indirect blocks 142. Metadata cache 140 holds the metadata temporarily, until such metadata can be flushed to persistent file-system structures, such as the subspaces 170*b*-170*d*.

As flushing to persistent file-system structures may take considerable time, which can expose metadata to a risk of loss, SP 120 activates the metadata log manager 160 to create transactions 152 that reflect the changed metadata. In an example, creating the transactions 152 involves consolidating updates for multiple mapping pointers 144 belonging to the same indirect block 142 into a single transaction 152. Thus, as shown by arrow 180, the metadata log manager 160 consolidates changes to multiple block pointers 144 in indirect block IB-1 (e.g., those shown as shaded). Metadata log manager 160 creates a new transaction entry, e.g., T4, in the metadata transaction log 150. For each mapping pointer 144 that changes, metadata log manager 160 creates a record that describes the changed mapping pointer. Metadata log manager 160 also creates a data structure that identifies all of the mapping pointers 144 that have changed (e.g., only the shaded ones) and stores the data structure in the new entry T4.

Later, when the metadata cache 140 has successfully written the changed metadata to persistent file-system structures (arrow 182), the metadata log manager 160 detects that transaction T4 is no longer needed and removes T4 from the metadata transaction log 150. However, if the SP 120 experiences a fault, such as a power failure or system panic, before writing out the changes (arrow 182), then the changes may disappear from the metadata cache 140. No metadata are lost, however, as transaction T4 still holds the changes. During recovery, metadata log manager 160 reads transaction T4 and, based on the information contained in the records of transaction T4, reestablishes the metadata in its proper form in the metadata cache 140. The metadata cache 140 may then flush the changed metadata to persistent structures (arrow 182) at some later time.

Although the metadata changes described in the example above arise as a result of write requests 112W, metadata changes may arise from other activities, as well, such as from generating snapshots, deduplicating data, or deleting data, for example. Indeed, any file-system operation that involves a change in metadata may entail forming new versions of metadata in metadata cache 140, creating a new entry for the changed metadata in the metadata transaction log 150, and writing the changed metadata to persistent file-system structures. Thus, one should appreciate that the activities described above may be carried out in a variety of contexts and for a variety of different file-system operations.

Figure 2:
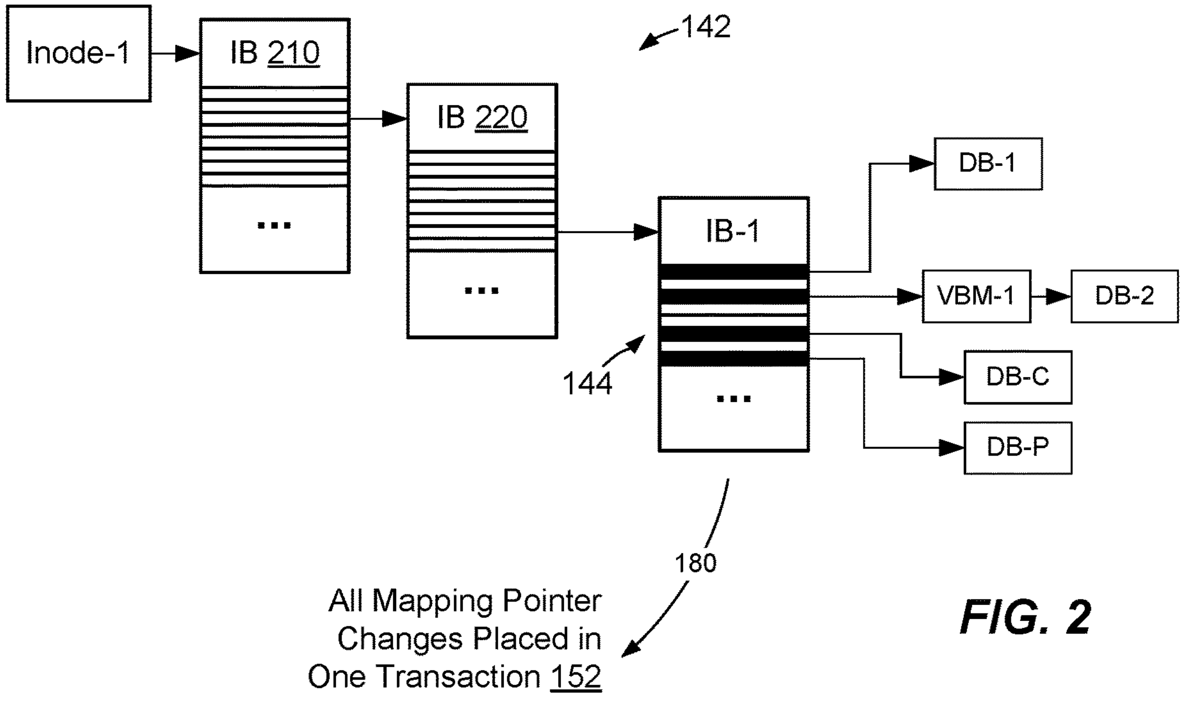
FIG. 2 is a block diagram of an example mapping structure for mapping certain data of a file.

FIG. 2 shows an example mapping arrangement in additional detail. Here, Inode-1 (FIG. 1) has been allocated by file system 170 for a particular file. Inode-1 includes information about the file, such as its size, ownership, and privileges. Inode-1 also includes one or more pointers to indirect blocks 142, which map the data of the file. Three levels of indirect blocks 142 are shown, including a first-level indirect block 210, a second-level indirect block 220, and IB-1, which is a terminal or "leaf" indirect block. For example, one of the mapping pointers in IB 210 points to IB 220, which itself includes a block pointer that points to IB-1.

As further shown in FIG. 2, some of the mapping pointers 144 in IB-1 point to normal data blocks, such as DB-1, whereas others point to block virtualization structures, such as VBM-1. Each VBM may itself point to a data block, such as DB-2, or to another VBM. In addition, some mapping pointers point to compressed blocks, such as DB-C, whereas others point to blocks containing predetermined patterns, such as DB-P. The patterns may include all zeros, all ones, alternating bits, or the like. The mapping pointers 144 that point to these different types of structures may themselves have different contents, which reflect their different uses. For example, the contents of a mapping pointer to a VBM may differ from the contents of a mapping pointer to a normal data block. The differences reflect various optimizations tailored to particular use cases, such as deduplication, snapshots, compression, or pattern matching, for example. Embodiments of the improved technique are able to coalesce different types of mapping pointers for different pointed-to structures optimized for different use cases.

Figure 3:
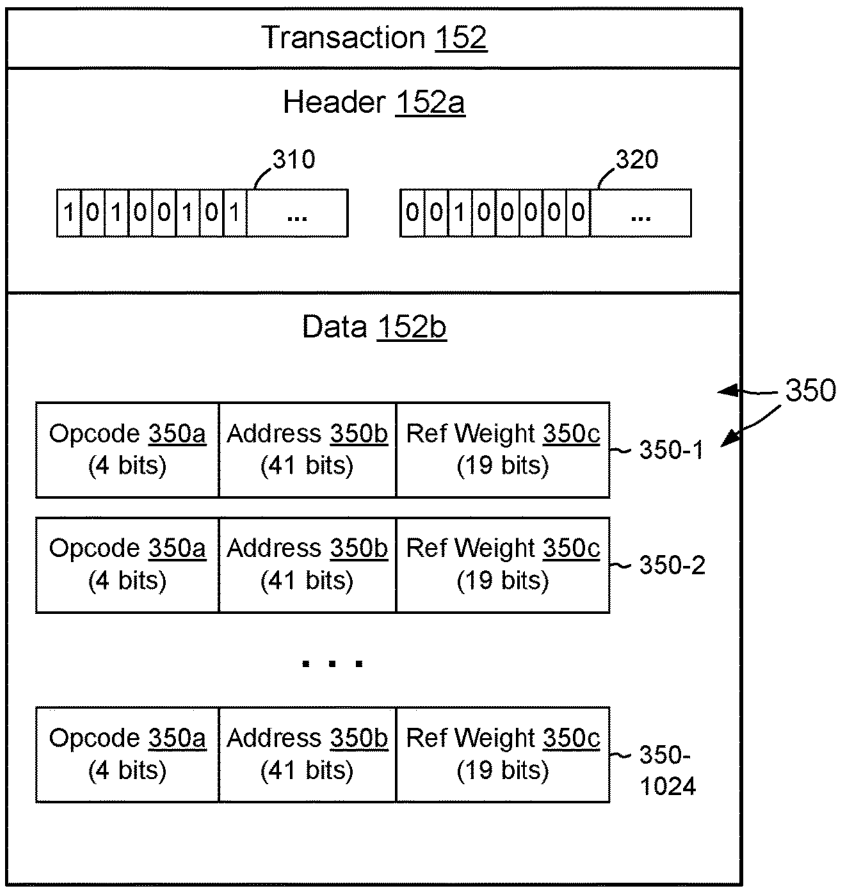
FIG. 3 is a block diagram of an example transaction entry in a metadata transaction log.

FIG. 3 shows an example structure of a transaction entry 152 in the metadata transaction log 150. Here, transaction 152 includes a header region 152*a* and a data region 152*b*. The header region 152*a* includes a data structure 310, which identifies all of the block pointers in an indirect block 134 that are changing. For example, data structure 310 may be provided as a bitmap having 1024 bit locations, one location for each of the 1024 mapping pointers that may be contained in a single indirect block 134. Although conventions may vary, a "1" at a certain position in the bitmap may indicate that the mapping pointer at the corresponding position in the indirect block 134 is being changed. Conversely, a "0" at a particular position may indicate that the mapping pointer at the corresponding position in the indirect block 134 is not being changed. In some examples, the header region 152*a* also includes a data structure 320, which indicates whether a mapping pointer at the corresponding location is being written or truncated (removed), e.g., with a "1" indicating written and a "0" indicating truncated, for example.

The data region 152*b* includes records 350, e.g., one record for each mapping pointer being changed. As up to 1024 mapping pointers can change in a single indirect block 134, 1024 records 350-1 through 350-1024 are shown. Typically, fewer than all block pointers of an indirect block will change and thus fewer than 1024 records 350 will be provided in the data region 152*b*. Records 350 are preferably ordered by position in the indirect block, such that the first record 350-1 corresponds to the first "1" in the data structure 310, the second record 350-2 corresponds to the second "1" in the data structure 310, and so on. In this fashion, the position to which each record 350 corresponds in the indirect block can be readily determined.

As further shown in FIG. 3, each record 350 includes an opcode 350*a*, an address 350*b*, and a reference weight 350*c*. In the arrangement shown, which is not intended to be limiting, each record consumes 64-bits (8 Bytes). Some records 50 may be twice this size, however, to support additional information. The overall size of the transaction entry 152 may be at most 64 kB, but this is also a non-limiting example.

Although the examples described thus far have specified one indirect block per transaction entry 152, embodiments hereof are not limited to this arrangement. For example, if block pointers of multiple indirect blocks can be changed together atomically, then multiple data structures 310 and 320 may be provided in header region 152*a*, one for each indirect block, and records 350 for multiple indirect blocks 142 may be included in data region 152*b*.

Figure 4:
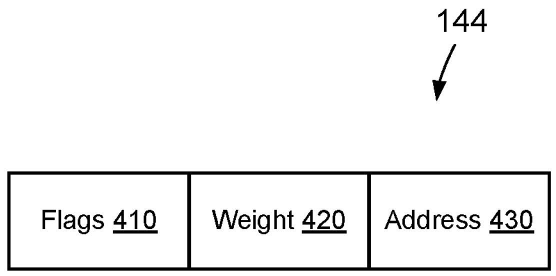
FIG. 4 is a block diagram of an example mapping pointer.

FIG. 4 shows an example layout of a typical mapping pointer 144. As shown, mapping pointer 144 includes flags 410, a reference weight 420, and an address 430. The flags 410 indicate, for example, information about the mapping pointer and/or the object to which the mapping pointer 144 is pointing, such as whether the mapping pointer 144 is pointing to a normal data block, to a VBM, to a compressed data block, or to a pattern-matched data block (FIG. 2). In an example, the reference weight 420 reflects a share of ownership that the mapping pointer 144 has over the pointed-to structure. The ownership share may change when certain activities are performed, such as write splits, deletions, or deduplication, for example. Address 430 is the location pointed to by the mapping pointer 144, such as the FSBN (FIG. 1) of the data block or VBM to which the mapping pointer is pointing.

Figure 5:
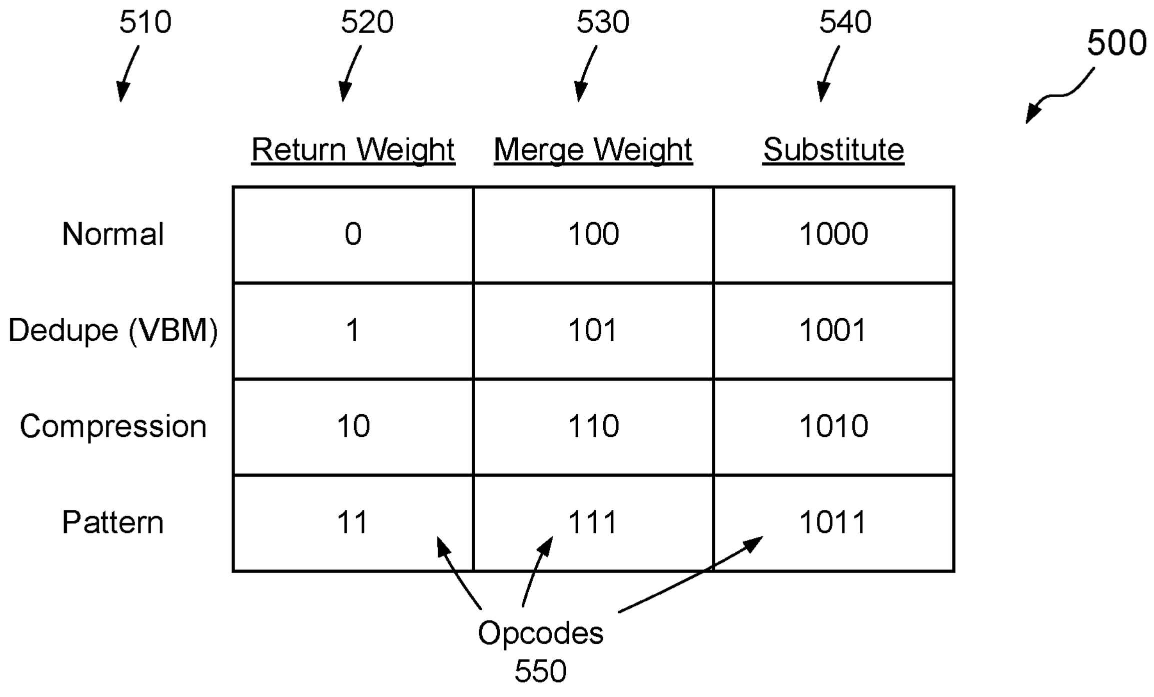
FIG. 5 is a table of example opcodes used to indicate different types of transactions.

FIG. 5 shows an example table 500 that organizes information for supporting different types of mapping pointers and different operations. Column 510 lists mapping pointer types, e.g., those that point to normal data blocks, VBMs, compressed data blocks, and patterns. Columns 520-540 represent activities that may be performed on mapping pointer fields, such as flags 410, reference weights 420, and addresses 430. Column 520 represents "Return Weight," which describes how reference weight 420 is adjusted to account for weight transferred back to a data block during certain file-system operations, such as deletes. Column 530 represents "Merge Weight," which describes how reference weight 420 is changed to account for weight transferred or received from another mapping pointer, which may be needed, for example, when deleting snapshots. Column 540 represents "Substitute," which describes how the contents of one mapping pointer are replaced with those of another.

A different opcode 550 is found at the intersection of each row and each column of table 500. These opcodes 550 correspond to the opcodes 350*a* in records 350 of the transaction entry 152 (FIG. 3). When creating a new record 350 for each mapping pointer 144 being changed, the metadata log manager 160 identifies the opcode 550 that describes the circumstances surrounding the mapping pointer change. As each opcode 550 specifies a respective scenario under which a mapping pointer 144 is being changed, the opcode 550 also prescribes a method for regenerating that mapping pointer when reading from the metadata transaction log 150 after a system fault. For example, an opcode of "0" stored in a record 350 informs the metadata log manager 160 that the mapping pointer 144 represented by that record 350 points to a normal data block and that a reference weight should be returned to the data block. By reading the opcodes 350*a* from the records 350 of a transaction 152, the metadata log manager 160 can properly reestablish, in the metadata cache 140, the proper changed state of each mapping pointer 144 recorded in the log.

One should appreciate that opcodes 350*a* may be different for different records 350 in a single transaction entry 152. Therefore, changes in different types of mapping pointers arising from different scenarios and operations may all be accommodated together in a single transaction. As a single transaction entry 152 may include changes to all mapping pointers in an indirect block, a bulk update of all such mapping pointers during recovery may be performed.

Figure 6:
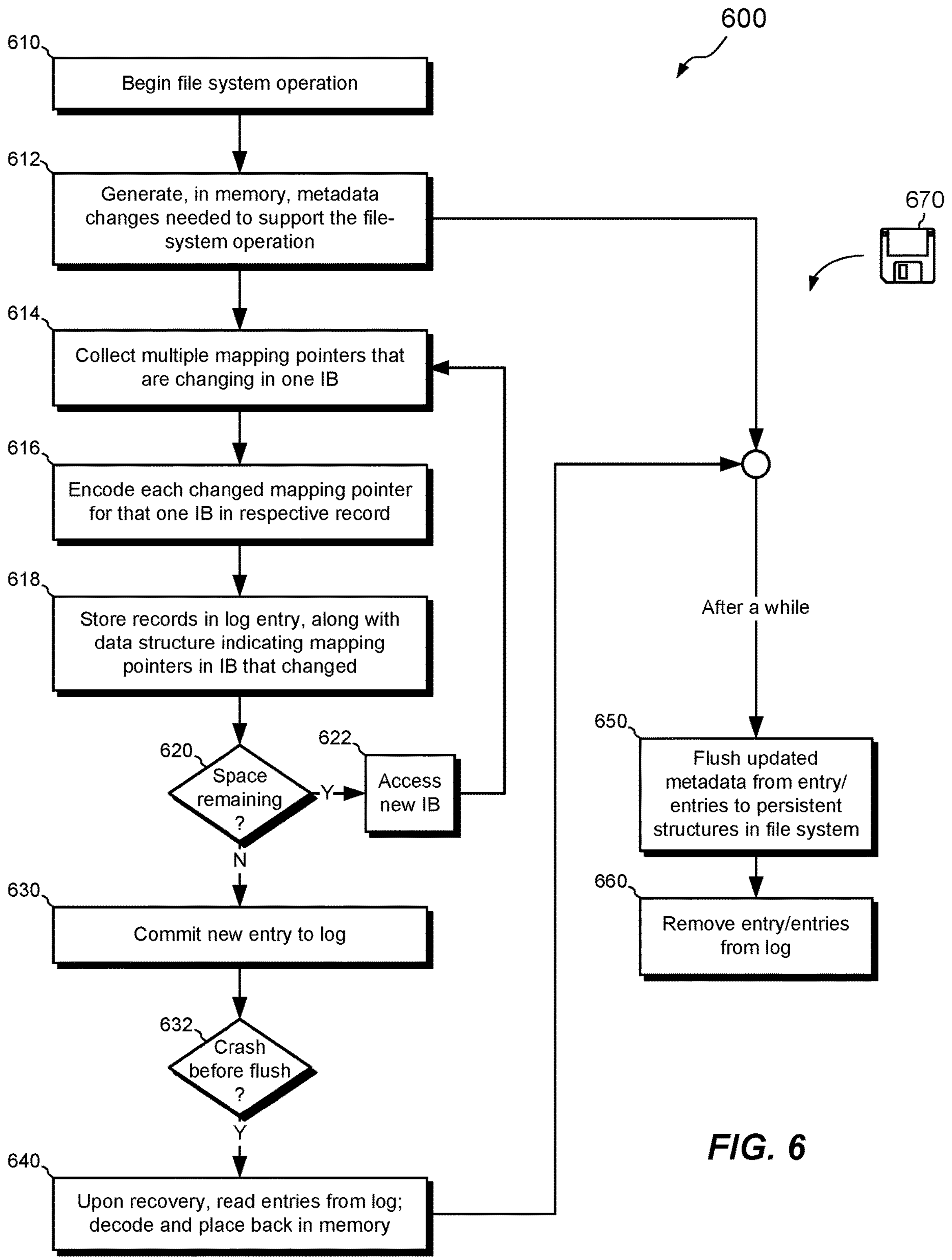
FIGS. 6 and 7 are flowcharts showing example methods for managing a metadata transaction log.
Figure 7:
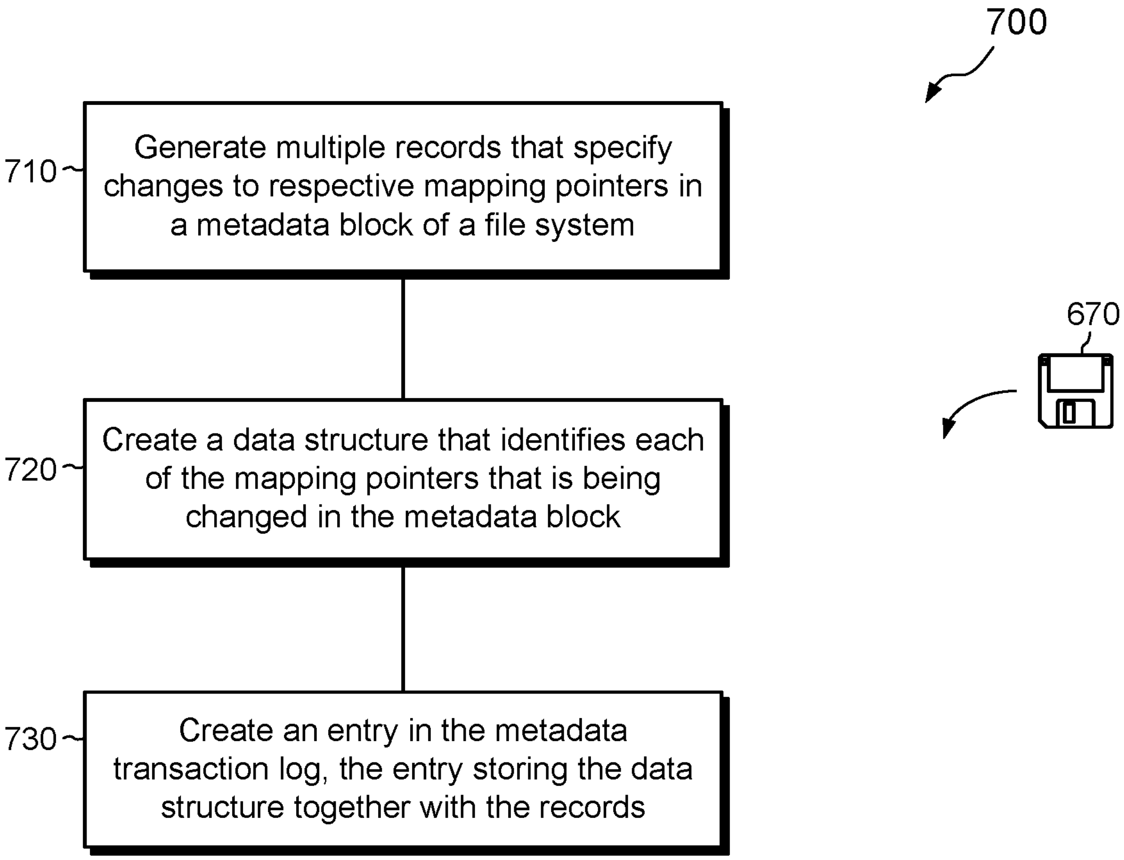

FIGS. 6 and 7 show example methods 600 and 700 that may be carried out in connection with the environment 100. The methods 600 and 700 are typically performed, for example, by the software constructs described in connection with FIG. 1, which reside in the memory 130 of the storage processor 120 and are run by the set of processors 124. The various acts of methods 600 and 700 may be ordered in any suitable way. Accordingly, embodiments may be constructed in which acts are performed in orders different from those illustrated, which may include performing some acts simultaneously.

As shown in FIG. 6, method 600 provides an example arrangement for managing the metadata transaction log 150. At 610, SP 120 begins performing a file-system operation, such as by receiving a write request 112W directed to a data object hosted by the data storage system 116, performing a write split, deleting data, deleting a snapshot, deduplicating data, or performing any other file-system operation that involves changing mapping pointers.

At 612, SP 120 generates, in metadata cache 140, metadata changes needed to support the initiated file-system operation. Such changes may include updating mapping pointers 144 in indirect blocks 142, for example.

At 614, SP 120 collects multiple mapping pointers being changed that reside in a single indirect block 142. For example, SP 120 may collect the shaded mapping pointers 144 in IB-1.

At 616, SP 120, e.g., acting through the metadata log manager 160, encodes each changed mapping pointer for the particular indirect block 142 in a respective record 350. For example, SP 120 encodes each of the collected shaded mapping pointers 144 in IB-1. Such encoding includes selecting an opcode 550 that identifies the circumstances surrounding the mapping pointer change and writing the selected opcode into field 350*a* of the record 350.

At 618, SP 120 stores the newly-created records in a transaction entry 152. It also stores in the new entry a data structure 310, such as a bitmap, which identifies the particular mapping pointers 144 in the indirect block that have changed (e.g., the shaded mapping pointers of IB-1). Transaction entry 152 may be a new entry if this is the first time act 618 is encountered during the method 600, but it may be an existing entry if records from a second indirect block are included in the same transaction (e.g., from act 622; see below).

At 620, SP 120 determines whether enough space remains in the newly-created transaction entry 152 to accommodate mapping pointer changes for an additional indirect block. If so, then a new indirect block is accessed at 622 and operation returns to 614, whereupon mapping pointers are collected for the new indirect block, encoded (at 616) and stored (618). Operation may continue in this loop until insufficient space remains for another indirect block, at which point operation proceeds to 630.

At 630, SP 120 commits the newly-created transaction entry 152 to the metadata transaction log 150, e.g., by writing the new entry to the tail of the metadata transaction log 150. At this point, the changes to the mapping pointers 144 are preserved, such that they may be accessed after a system fault to restore consistency.

At 632, SP 120 checks whether a system fault occurred before the metadata changes were flushed to persistent file-system structures, which may have happened at any time after the changes were generated during act 612. In an example, determining whether a crash occurred before flushing is simply a matter of recognizing that a fault occurred and checking for any transactions 152 still pending in the metadata transaction log 150. If any pending transactions are found, operation proceeds to 640, whereupon SP 120 reads the pending entries 152 from the metadata transaction log 150, decodes the entries (applying the opcodes stored in fields 350*a*), and reconstitutes the changed mapping pointers in the metadata cache 140.

Once the changed mapping pointers are back in cache, they may be flushed in the usual manner (act 650). Then, any entries 152 read from the metadata transaction log 150 and restored to cache may be removed from the metadata transaction log 150 (act 660).

Turning now to FIG. 7, the example method 700 summarizes some of the features described hereinabove. At 710, SP 120 generates multiple records 350 that specify changes to respective mapping pointers 144 in a metadata block 142 of the file system 170. The changes may be specified as changes from a baseline or as versions of the mapping pointers after the changes are made. At 720, SP 120 creates a data structure 310 that identifies each of the mapping pointers 144 that is being changed in the metadata block 142. At 730, SP 120 creates an entry 152 in the metadata transaction log 150 that stores the data structure 310 together with the records 350.

An improved technique has been described for managing a metadata transaction log 150. The technique consolidates multiple mapping pointer changes that affect a single metadata block 142 within a single transaction entry 152. The technique creates a data structure 310 that identifies the mapping pointers 144 in the metadata block 142 that are changing, and stores the data structure 310 in the transaction entry 152 along with records 350 that describe the individual mapping pointer changes.

Having described certain embodiments, numerous alternative embodiments or variations can be made. For example, although the mapping pointers 144 as shown and described herein are located within indirect blocks 142, they may alternatively be located within other metadata structures. Thus, the disclosed techniques are not limited to any particular metadata block type or to any particular type of file system.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 670 in FIGS. 6 and 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing a metadata transaction log used by a file system of a computerized apparatus, the method comprising:

generating multiple records that include opcodes that specify changes to respective mapping pointers in a metadata block of the file system, each record of the multiple records generated for a respective mapping pointer and including a respective opcode, the opcodes generated on a per-record basis based on (i) a type of mapping pointer associated with the respective record and (ii) an activity to be performed on fields of the mapping pointer associated with the respective record;

creating a data structure that identifies each of the mapping pointers that is being changed in the metadata block;

creating an entry in the metadata transaction log, the entry storing the data structure together with the records, the records stored in the entry excluding records for mapping pointers in the metadata block that are not changing, and the records stored in the entry in order of respective mapping pointers that are changing in the metadata block; and in response to the computerized apparatus experiencing a fault, reading the entry from the metadata transaction log and flushing metadata changes specified by the entry to persistent structures of the computerized apparatus.

2. The method of claim 1, further comprising, after creating the entry:

reading the entry from the metadata transaction log;

processing the entry to generate a memory-resident version of the metadata block that reflects the specified changes to the mapping pointers; and writing the memory-resident version of the metadata block to persistent storage.

3. The method of claim 2, wherein processing the entry includes:

accessing the data structure from the entry; and for each mapping pointer that the data structure identifies as being changed, implementing the specified changes to that mapping pointer in the memory-resident version of the metadata block.

4. The method of claim 2, wherein an opcode indicates a type of mapping pointer specified by that record, and wherein processing of the entry is based upon the specified type of mapping pointer as indicated by the opcode.

5. The method of claim 4, wherein the specified type of mapping pointer indicated by the opcode includes one of (i) a normal data block type, (ii) a block virtualization structure type, (iii) a compressed data block type, and (iv) a pattern-matched data block type.

6. The method of claim 4, wherein the opcode further indicates an activity to be performed for the indicated type of mapping pointer, and wherein processing of the entry is further based on the indicated activity.

7. The method of claim 5, wherein the indicated activity includes at least one of (i) returning a reference weight previously distributed to that mapping pointer, (ii) merging a reference weight to or from another block pointer, and (iii) substituting a new block pointer in place of an existing one.

8. The method of claim 7, wherein said one or more of the records further includes (i) an address that indicates a file-system address pointed to by that block pointer and (ii) at least one reference weight that indicates a reference weight to be returned or merged.

9. The method of claim 2, wherein creating the entry includes:

storing the data structure in a header region of the entry; and storing each of the records in a data region of the entry.

10. The method of claim 9, further comprising creating a second data structure that identifies which of the mapping pointers in the metadata block are being written and which are being removed, wherein creating the entry further includes storing the second data structure in the header region of the entry.

11. The method of claim 9, further comprising, for each of a set of additional metadata blocks:

generating new records for changed block pointers in the respective additional metadata block;

creating a new data structure that identifies each of the mapping pointers in the respective additional metadata block that is being changed; and storing the new records and new data structure in the entry.

12. The method of claim 1, further comprising generating the opcodes as respective multi-bit values based on (i) respective types of mapping pointers being changed and (ii) respective activities to be performed on the mapping pointers being changed.

13. The method of claim 12, wherein the respective activities to be performed include operations on flags, reference weights, and/or addresses of the respective mapping pointers.

14. The method of claim 12, wherein at least two of the records stored in the transaction entry include opcodes that differ from each other.

15. A computerized apparatus, comprising control circuitry hardware that includes a set of processing units coupled to memory, the control circuitry constructed and arranged to:

generate multiple records that include opcodes that specify changes to respective mapping pointers in a metadata block of a file system, each record of the multiple records generated for a respective mapping pointer and including a respective opcode, the opcodes generated on a per-record basis based on (i) a type of mapping pointer associated with the respective record and (ii) an activity to be performed on fields of the mapping pointer associated with the respective record;

create a data structure that identifies each of the mapping pointers that is being changed in the metadata block;

create an entry in a metadata transaction log, the entry storing the data structure together with the records, the records stored in the entry excluding records for mapping pointers in the metadata block that are not changing, and the records stored in the entry in order of respective mapping pointers that are changing in the metadata block; and in response to the computerized apparatus experiencing a fault, read the entry from the metadata transaction log and flush metadata changes specified by the entry to persistent structures of the computerized apparatus.

16. A computer program product including a set of non-transitory, computer-readable media having instructions which, when executed by control circuitry of a computerized apparatus, cause the control circuitry to perform a method of managing a metadata transaction log used by a file system, the method comprising:

generating multiple records that include opcodes that specify changes to respective mapping pointers in a metadata block of the file system, each record of the multiple records generated for a respective mapping pointer and including a respective opcode, the opcodes generated on a per-record basis based on (i) a type of mapping pointer associated with the respective record and (ii) an activity to be performed on fields of the mapping pointer associated with the respective record;

creating a data structure that identifies each of the mapping pointers that is being changed in the metadata block;

creating an entry in the metadata transaction log, the entry storing the data structure together with the records, the records stored in the entry excluding records for mapping pointers in the metadata block that are not changing, and the records stored in the entry in order of respective mapping pointers that are changing in the metadata block; and in response to the data storage system experiencing a fault, reading the entry from the metadata transaction log and flushing metadata changes specified by the entry to persistent structures of the data storage system.

17. The computer program product of claim 16, wherein the method further comprises, after creating the entry: reading the entry from the metadata transaction log;

processing the entry to generate a memory-resident version of the metadata block that reflects the specified changes to the mapping pointers; and writing the memory-resident version of the metadata block to persistent storage.

18. The computer program product of claim 17, wherein an opcode indicates a type of mapping pointer specified by that record, and wherein processing of the entry is based upon the specified type of mapping pointer as indicated by the opcode.

19. The computer program product of claim 18, wherein the specified type of mapping pointer indicated by the opcode includes one of (i) a normal data block type, (ii) a block virtualization structure type, (iii) a compressed data block type, and (iv) a pattern-matched data block type.

20. The computer program product of claim 18, wherein the opcode further indicates an activity to be performed for the indicated type of mapping pointer, and wherein processing of the entry is further based on the indicated activity, and wherein the indicated activity includes at least one of (i) returning a reference weight previously distributed to that mapping pointer, (ii) merging a reference weight to or from another block pointer, and (iii) substituting a new block pointer in place of an existing one.

21. The computer program product of claim 20, wherein said one or more of the records further includes (i) an address that indicates a file- system address pointed to by that block pointer and (ii) at least one reference weight that indicates a reference weight to be returned or merged.

22. The computer program product of claim 17, wherein creating the entry includes: storing the data structure in a header region of the entry; and storing each of the records in a data region of the entry.

23. The computer program product of claim 22, wherein the method further comprises creating a second data structure that identifies which of the mapping pointers in the metadata block are being written and which are being removed, and wherein creating the entry further includes storing the second data structure in the header region of the entry.

* * * * *